(12) United States Patent
Kim et al.

(10) Patent No.: US 7,209,282 B2
(45) Date of Patent: Apr. 24, 2007

(54) CASCADED DIFFERENCE FREQUENCY GENERATOR USING RESONANT STRUCTURE

(75) Inventors: Jong Bae Kim, Daejeon (KR); Jung Jin Ju, Daejeon (KR); Min Su Kim, Daejeon (KR); Byeong Ha Lee, Gwangju (KR)

(73) Assignee: Electronics and Telecommunications Research Institute, Daejeon-shi (KR)

( * ) Notice: Subject to any disclaimer, the term of this patent is extended or adjusted under 35 U.S.C. 154(b) by 133 days.

(21) Appl. No.: 11/025,080

(22) Filed: Dec. 30, 2004

(65) Prior Publication Data
US 2005/0213194 A1 Sep. 29, 2005

(30) Foreign Application Priority Data
Mar. 29, 2004 (KR) .................. 10-2004-0021105

(51) Int. Cl.
*G02F 1/37* (2006.01)
(52) U.S. Cl. ..................... 359/328; 359/326
(58) Field of Classification Search ......... 359/326–332
See application file for complete search history.

(56) References Cited

U.S. PATENT DOCUMENTS

| | | | | |
|---|---|---|---|---|
| 5,341,236 A | * | 8/1994 | Stappaerts | 359/328 |
| 5,880,877 A | * | 3/1999 | Fermann et al. | 359/341.31 |
| 6,014,249 A | * | 1/2000 | Fermann et al. | 359/341.1 |
| 6,101,023 A | | 8/2000 | Meyer, Jr. et al. | 359/330 |
| 6,167,067 A | | 12/2000 | Meyer, Jr. et al. | 372/21 |
| 6,282,014 B1 | | 8/2001 | Long | 359/330 |

OTHER PUBLICATIONS

I. Brener, et al.; "Cascaded χ2 wavelength converter in LiNbO3 waveguides with counter-propagating beams"; Electronics Letters; Jul. 8, 1999; vol. 35, No. 14, pp. 1155-1157.

Chang-Qing Xu, et al.; "Intracavity wavelength conversions employing a MgO-doped LiNbO3 quasi-phase-matched waveguide and an erbium-doped fiber amplifier"; Optical Society of America; Oct. 10, 2003; vol. 20, No. 10, pp. 2142-2149.

Gerald T. Moore; "Resonant Sum-Frequency Generation"; IEEE Journal of Quantum Electronics; Jan. 2002; vol. 38, No. 1, pp. 12-18.

J.M. Yarborough, et al.; "Simultaneous Optical Parametric Oscillation, Second Harmonic Generation, and Difference-Frequency Generation*"; Applied Physics Letters; Feb. 15, 1971; vol. 18, No. 4, pp. 145-147.

Katia Gallo, et al.; "Efficient wavelength shifting over the erbium amplifier bandwidth via cascaded second order processes in lithium niobate waveguides:"; Applied Physics Letters; Aug. 25, 1997; vol. 71, No. 8, pp. 1020-1022.

* cited by examiner

*Primary Examiner*—John D. Lee
(74) *Attorney, Agent, or Firm*—Lowe Hauptman & Berner, LLP (57) ABSTRACT

Provided is a resonant cascaded difference frequency generator that is capable of improving the conversion efficiency of the second-order nonlinear optical phenomena by resonating the second harmonic wave of a pump light. The resonant cascaded difference frequency generator includes: a nonlinear medium, which receives a pump light and a signal light and then generates the second harmonic wave of the pump light through second harmonic generation, in a cascaded way generates a converted light of a difference frequency through difference frequency generation between the signal light and the second harmonic wave; and a resonant structure that resonates the second harmonic wave of the pump light on the basis of the nonlinear medium.

15 Claims, 4 Drawing Sheets

CASCADED DIFFERENCE FREQUENCY GENERATOR USING RESONANT STRUCTURE

CROSS-REFERENCE TO RELATED APPLICATION

This application claims priority to and the benefit of Korean Patent Application No. 2004-21105, filed on Mar. 29, 2004, the disclosure of which is incorporated herein by reference in its entirety.

BACKGROUND

1. Field of the Invention

This invention relates generally to a cascaded difference frequency generator using a resonant structure, and more specifically, to a resonant cascaded difference frequency generator capable of improving the conversion efficiency of second-order nonlinear optical phenomena by resonating the second harmonic wave of a pump light.

2. Discussion of Related Art

Since an optical phenomenon related to second-order nonlinearity was first discovered, one of the major concerns in the long history of research on the optical phenomenon has been to improve the conversion efficiency in the phenomenological process. A lot of attempts to obtain the higher conversion efficiency include searching materials with higher nonlinear structures, composing new materials, finding new methods of phase-matching in various manners, and fabricating a nonlinear material into an optical waveguide form to increase the interaction of three light waves to be mixed, etc.

The difference frequency generation is to obtain a newly converted idler light (Wi) corresponding to a difference frequency between a signal light (Ws) and a pump light (Wp) by mixing the two lights in a second-order nonlinear medium. In this case, the newly converted light is obtained through the interaction of three wave mixing in virtue of the second-order nonlinearity (see J. A. Armstrong, N. Bloembergen, J. Ducuing, and P. S. Pershan, "Interactions between light in a nonlinear dielectric," Phys. Rev., vol. 127, pp. 1918–1939, 1962). Since the second-order nonlinear process of generating difference frequency, as described above, is an all-optical interaction excluding electrical interactions, it can be useful for wavelength conversion in ultra-high speed optical communication. In addition, since the converted light generated by the process has a conjugated phase due to the second-order nonlinear interaction, it can be useful for dispersion compensation in the ultra-high speed optical communication as well.

Precisely speaking, the direct difference frequency generation is to obtain a converted light of a difference frequency (Wi=Wp−Ws) between the signal light (Ws) and the pump light (Wp) through directly putting the two lights into a second-order nonlinear medium. On the other hand, the cascaded difference frequency generation is to obtain a converted light (Wi) through putting the signal light (Ws) and the pump light (Wp) into a second-order nonlinear medium, generating the second harmonic wave (Wp+Wp=2Wp) of a doubled frequency, and then generating the cascaded difference frequency in virtue of a simultaneous interaction between the second harmonic wave the pump light and the incident signal light (Wi=2Wp−Ws) (see, B. Zhou, C. Q. Xu, and B. Chen, "Comparison of difference frequency generation and cascaded based wavelength conversion in $LiNbO_3$ quasi-phase-matched waveguides," J. Opt. Soc. Am. B. 20, pp. 846–852, 2003). In a wavelength band adjacent to a communication wavelength range of optical communication, if a wavelength of the converted light (Wi) is not significantly different from that of the incident signal light (Ws), i.e. Wi≈Ws, the direct difference frequency generation essentially needs a completely new light-source equivalent to the frequency Wp of the pump light. In the meanwhile, since the cascaded difference frequency generation can be performed even though the frequency of the pump light is not significantly different from that of the signal light, i.e. Wp≈Wi≈Ws, it does not necessitate another light-source corresponding to the frequency of 2Wp. Thus, it has an advantage that the same kind of a light-source within the communication wavelength band can be used as a source of the pump light.

However, in the case of the cascaded difference frequency generation, if the incident pump and signal lights pass through the nonlinear medium, the pump light first generates the second harmonic wave by the nonlinear process, and then this second harmonic wave of the pump light is coupled to the signal light by the nonlinear process to generate the converted light. In other words, the cascaded difference frequency generator generates the converted light by the $(X^{(2)}:X^{(2)})$ processes in virtue of cascaded second-order nonlinear interactions. Therefore, it has a problem that its conversion efficiency is degraded, and therefore a large amount of the signal light, the pump light, and the second harmonic wave of the pump light do not participate in the nonlinear interactions, but are transmitted outside together with the converted light.

SUMMARY OF THE INVENTION

The present invention is directed to a resonant cascaded difference frequency generator using a new resonant structure to enhance conversion efficiency in a cascaded difference frequency generation by second-order nonlinear optical phenomena.

In addition, the present invention is directed to various types of resonant structures for the resonant cascaded difference frequency generation.

One aspect of the present invention is to provide a resonant cascaded difference frequency generator using a resonant structure comprising, a nonlinear medium that receives a pump light and a signal light to generate a second harmonic wave through second harmonic generation of the pump light, and that in a cascaded way generate a converted light of a difference frequency through difference frequency generation between the signal light and the second harmonic wave; and a resonant structure that makes the second harmonic wave resonate on the basis of the nonlinear medium.

In the meanwhile, "a resonant structure" is not limited to a particular form, and can employ any structure in which the signal light, the pump light, and the converted light are transmitted, but the second harmonic wave is not transmitted outside but reflected for resonance by the inner reciprocating or circulating motion. For example, the resonant structure may be composed of optical mirrors such as dielectric mirrors, grating mirrors made of the medium itself, optical fiber grating mirrors, optical fiber loop mirrors, optical fiber ring resonators, and so forth.

BRIEF DESCRIPTION OF THE DRAWINGS

The above and other features of the present invention will be described in reference to certain exemplary embodiments thereof with reference to the attached drawings in which.

DETAILED DESCRIPTION OF PREFERRED EMBODIMENTS

Hereinafter, resonant cascaded difference frequency generators according to embodiments of the present invention will be explained with reference to the appended drawings. However, those skilled in the art will appreciate that various adaptations and modifications of the following preferred embodiments can be made without departing from the scope and spirit of the invention. Therefore, it will be understood that the scope of invention does not limited to the following described embodiments.

Figure 1:
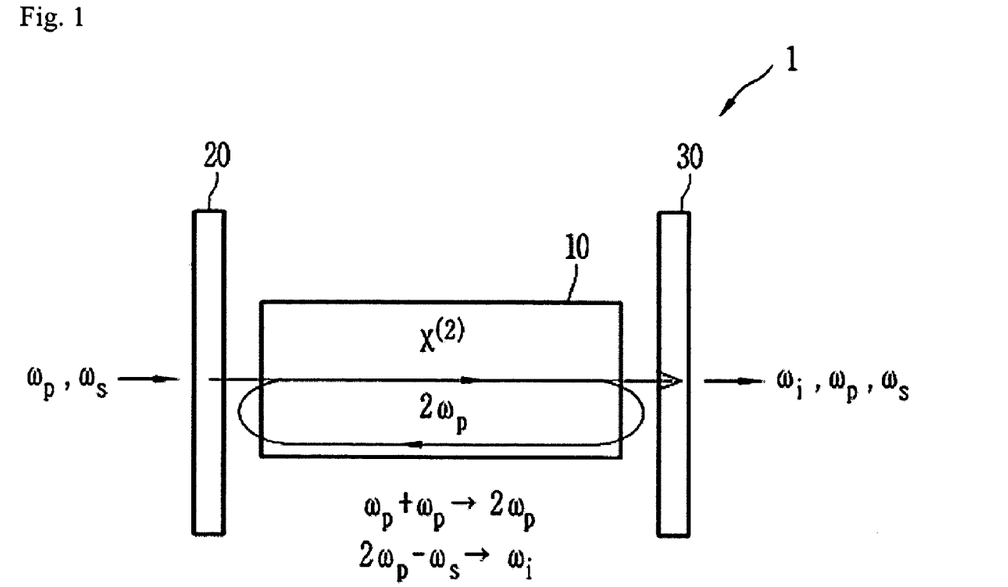
FIG. 1 is a schematic diagram of a resonant cascaded difference frequency generator according to one embodiment of the present invention.

FIG. 1 is a schematic diagram of a resonant cascaded difference frequency generator according to one embodiment of the present invention.

The resonant cascaded difference frequency generator 1 includes resonant structures 20 and 30 receiving a pump light (Wp) and a signal light (Ws) to resonate the second harmonic wave (2Wp) of the pump light (Wp), and a nonlinear medium 10 placed inside the resonant structures to generate the second harmonic wave (2Wp) and then generate a converted light (Wi) corresponding to a difference frequency by means of the coupling of the signal light (Ws) and the second harmonic wave (2Wp). FIG. 1 illustrates an example of the resonant structure employing dielectric mirrors, but it is evident that the present invention is not limited thereto.

Referring to FIG. 1, the resonant structure includes the first dielectric mirror 20 installed at one side of the nonlinear medium 10, and the second dielectric mirror 30 installed at the other side of the nonlinear medium 10. In addition, the first dielectric mirror 20 and the second dielectric mirror 30 are placed opposite (face-to-face) and parallel to each other to fully and selectively reflect only the second harmonic wave (2Wp) of the pump light (Wp), and then to reciprocate and resonate the second harmonic wave (2Wp) of the pump light (Wp) between the first dielectric mirror 20 and the second dielectric mirror 30. The signal light (Ws) and the pump light (Wp) are incident on the first dielectric mirror 20, while the converted light (Wi), the signal light (Ws), and the pump light (Wp) are transmitted from the second dielectric mirror 30. The pump light (Wp) and the signal light (Ws) can be directly incident from light-sources, or guided by optical fibers from outside of the resonant structure.

The nonlinear medium 10 is placed along the same path that the light waves are propagating. In addition, the nonlinear medium 10 is not limited to a particular form, but can employ any materials such as crystalline, semiconductor, silica, or polymer that possesses a intrinsic second-order nonlinearity or can induce the second-order nonlinearity by means of poling, etc. The nonlinear medium 10 can be also fabricated in the form of an optical waveguide or an optical fiber to reduce a loss caused by the propagation of the light wave and consequently to improve the conversion efficiency of the nonlinear interaction. Furthermore, the nonlinear medium 10 can be constructed to satisfy a phase-matching condition (see, R. L. Sutherland, "HANDBOOK OF NON-LINEAR OPTICS," Marcel Dekker, Inc., 1996) required among three light waves to be mixed.

The nonlinear medium, of which second-order nonlinear susceptibility is defined as $X^{(2)}$, simultaneously satisfies a phase-matching condition for the second harmonic generation by the pump light and for the difference frequency generation by the generated second harmonic wave and the incident signal light (see, J. M. Yarborough and E. O. Ammann, "Simultaneous optical parametric oscillation, second harmonic generation, and difference frequency generation," Appl. Phys. Lett., vol. 18, pp. 145–147, 1971). Additionally, dielectric mirrors, which serve as the resonant structure, transmits the pump light, the signal light, and the converted light, but selectively and fully reflects the second harmonic wave of the pump light so as to repeatedly reciprocate inside.

Here, once the phase-matching condition for difference frequency generation is determined and satisfied among the three lights of the signal wave, the pump wave, and the converted wave propagating in the same forward direction as that of the signal light, in the case of the second harmonic wave that is reflected from the output part of the resonator and propagates backward in the opposite direction to that of the signal light, the converted light corresponding to the difference frequency is not generated because the phase-matching condition between the backward second harmonic wave and the forward signal wave differs from that of the second harmonic wave and the signal wave propagating in the same forward direction (see, I. Brener, M. H. Chou, D. Peale, and M. M. Fejer, "Cascaded chi^{(2)} wavelength converter in LiNbO$_3$ waveguides with counter-propagating beams," Electron Lett., vol. 35, pp. 1155–1157, 1999).

As a matter of a fact, the direct difference frequency generation, if there is no loss, is approximately represented as the following equation (1);

$$P_i(\omega_i) \propto (X^{(2)}) P_s(\omega_s) P_p(2\omega_p) L^2 \qquad (1)$$

wherein, Ps and Pp denote, respectively, the intensity of the signal light and the pump light which are incident on the nonlinear medium of the second-order nonlinear magnitude $X^{(2)}$, L is the interaction length, while Pi denotes the intensity of the converted light that is converted by the difference frequency generation and transmitted outside.

Also, for the cascaded difference frequency generation, the pump light that has a frequency 2Wp expressed in the equation (1) is roughly represented as the following equation (2);

$$P_p(2\omega_p) \propto )X^{(2)})^2 P_p^2(\omega_p) L^2 \qquad (2)$$

Additionally, if the second harmonic wave is generated from the incident pump light with the frequency Wp, the intensity of converted light Pi (Wi) is represented as the following equation (3) (see, G. P. Banfi, P. K. Datta, V. Degiogio, and D. Fortusini, "Wavelength shifting and amplification of optical pulses through cascaded second processes in periodically poled lithium niobate," Appl. Phys. Lett., vol. 7, pp. 136–138, 1998);

$$P_i(\omega_i) \propto (X^{(2)}:X^{(2)})^2 P_s(\omega_s) P_p^2(\omega_p) L^4 \qquad (3)$$

Accordingly, the converted light by the direct difference frequency generation is linearly proportional to the intensity of the signal light and the pump light, and is in a quadratic form proportional to the interaction length. However, the intensity of the converted light by cascaded difference frequency generation is linearly and quadratically proportional to the intensity of the signal light and the pump light, respectively, but is quartically proportional to the interaction length. Therefore, the intensity of the converted light depends more sensitively on the changes of the intensity or the interaction length of the pump light.

Next, the operation principle of the resonant cascaded difference frequency generator 1 will be described in detail with reference to FIG. 1.

First, if the incident pump light (Wp) and the incident signal light (Ws) transmit the first dielectric mirror 20 and propagate through the nonlinear medium 10, the pump light (Wp) satisfies the phase-matching condition and is transformed into the second harmonic wave (Wp+Wp→2Wp). And then, the phase-matching condition between the second harmonic wave with the doubled frequency (2Wp) and the propagating signal light (Ws) is simultaneously satisfied to generate the converted light (Wi) with the difference frequency (2Wp−Ws→Wi) cascadedly. In this case, the converted light with the generated frequency (Wi), which passes through the resonant structure of the output part, is transmitted outside together with the rests of the pump light (Wp) and the signal light (Ws) that propagates as they are without participating in the second-order nonlinear interactions.

On the contrary, the second harmonic wave (2Wp) that dose not participate in the difference frequency generation even while propagating through the nonlinear medium 10 is fully reflected by the second dielectric mirror 30 in the output part of the resonant structure, and then returns backward along the propagating path. In this case, since the backward second harmonic wave propagates in the direction opposite to the forward direction of the incident signal light (Ws), the phase matching conditions become changed each other and consequently, the phenomenon of the difference frequency generation does not occur. Once again, the backward second harmonic wave is fully reflected by the first dielectric mirror 10 in the input part of the resonant structure and propagates forward as in the first incident direction. It then couples with a new incident signal light (Ws) again thereby to be transformed into the converted light (Wi) with the difference frequency.

Accordingly, the difference between the cascaded difference frequency generation of the prior art and the resonant difference frequency generation according to the present invention is as follows: in the former case, amid the second harmonics wave with the doubled frequency generated while the pump light (Wp) passes through the nonlinear medium 10, the rest of the second harmonic wave that does not participate in the nonlinear interaction of the difference frequency generation, is transmitted outside without change, on the other hand, in the latter case, the rest of the second harmonic wave that does not participate in the difference frequency generation goes back to the input part by the resonant apparatus in the output part and then goes back again to the output part by the resonant apparatus in the input part to be added to a newly generated second harmonic wave, thereby to generate the converted light (Wi) in virtue of interaction with the incident signal light (Ws).

Therefore, the resonance of the second harmonic wave that is repeatedly reciprocated or circulated on the basis of the nonlinear medium, which plays the role of dramatically enhancing the effective intensity of the second harmonic wave interacting with the signal light (Ws), consequently leads to the intensity improvement of the converted light (Wi) with the difference frequency.

The resonant cascaded difference frequency generator can be really constructed, for example, by using an optical waveguide of the periodically poled $LiNbO_3$ (Lithium niobate). In this case, by adopting the proper poling period for quasi-phase matching, it is possible to simultaneously satisfy the phase-matching condition of the second harmonic generation by the pump light and of the difference frequency generation by the generated second harmonic wave and the incident signal light.

If explained in more detail, the dielectric mirror can be constructed by dielectric coating that consists of dielectric materials or metal (for example, a stack layer of $Al_2O_3$ and silicon) at an input part and an output part of the optical waveguide, using a evaporation method such as E-beam. In this case, by properly selecting a thickness of the dielectric to be stacked and a kind of material, etc, the mirror can be fabricated to fully reflect the second harmonic wave (2Wp) of the incident pump light but to transmit the signal light (Ws), the pump light (Wp), and the converted light (Wi) without reflection.

In the following descriptions, the resonant structures usable in the resonant cascaded difference frequency generators according to preferred embodiments of the present invention will be explained in more detail. The resonant cascaded difference frequency generators have a basic principle and an operation similar to the aforementioned description, and can have different resonant structures according to the types of optical devices. FIGS. 2 to 8 are diagrams for explaining examples of resonant structures usable in the cascaded difference frequency generators according to preferred embodiments of the present invention.

Figure 2:
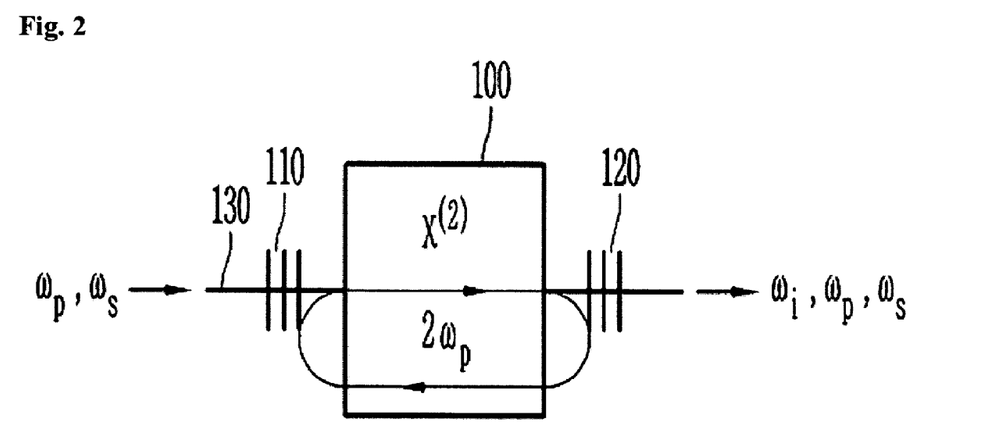
FIGS. 2 to 8 are diagrams for explaining examples of resonant structures useable in resonant cascaded difference frequency generators according to preferred embodiments of the present invention, respectively.

FIG. 2 is a diagram for explaining a resonant structure composed of optical fiber grating mirrors to be used in a cascaded difference frequency generator according to a preferred embodiment of the present invention.

This resonant structure includes the first optical fiber grating mirror 110 installed at one side of a nonlinear medium 100, and the second optical fiber grating mirror 120 installed at the other side of the nonlinear medium 100. This resonant structure has a function equal to the resonant structure of FIG. 1, even though it has the optical fiber grating mirrors instead of the dielectric mirrors of FIG. 1. Preferably, the light waves to be incident and transmitted are guided by an optical fiber 130.

By the way, since the optical fiber grating mirrors used for such a resonant structure can be made so that the mirror may be placed within the optical fiber, it is possible to relatively reduce the loss and improve the conversion efficiency.

The first and the second optical fiber grating mirrors 110 and 120 are optical devices with such a form that a refractive index periodically changes in an optical fiber core. For example, the optical fiber grating mirrors of a sample grating can be made by illuminating the Ultra-Violet beams into the fiber core using a phase mask and an amplitude mask. For the optical fiber grating mirrors prepared in this way, reflection and transmission spectra applicable to the present invention are obtained by properly adjusting the period of fiber gratings. In other words, the first optical fiber grating mirror 110 is made to have a structure for transmitting the signal light and the pump light but reflecting the second harmonic wave of the pump light. The second optical fiber grating mirror 120 is made to have a structure for transmitting the converted light but reflecting the second harmonic wave of the pump light to thereby have a structure capable of reciprocating and resonating inside the resonator.

Figure 3:
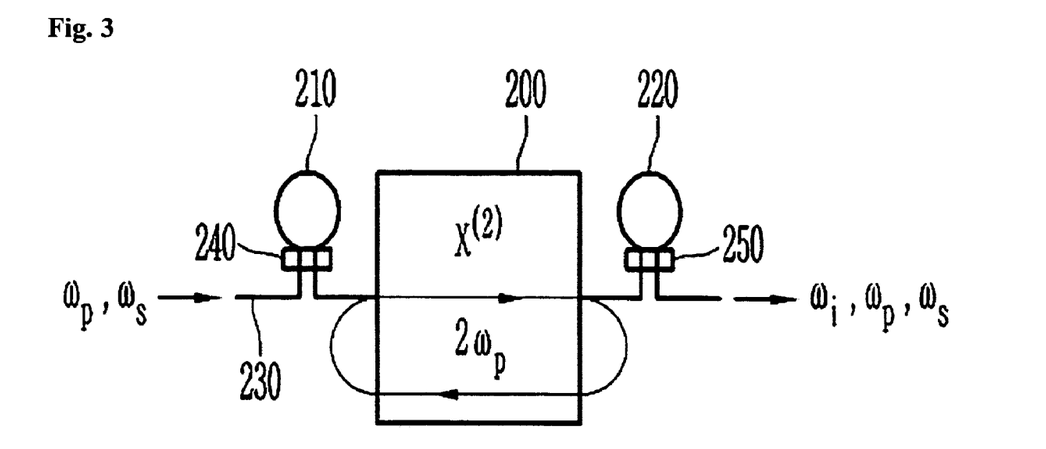

FIG. 3 is a diagram for explaining a resonant structure composed of optical fiber loop mirrors usable in a resonant cascaded difference frequency generator according to a preferred embodiment of the present invention.

This resonant structure includes the first loop mirror 210 and 240 installed at one side of the nonlinear medium 200 and the second loop mirror 220 and 250 installed at the other side of the nonlinear medium 200. The first loop mirror 210 and 240 includes the first optical coupler 240 (for example, WDM optical coupler) for dividing an incident signal into a constant ratio (for example, 50:50), and the first optical fiber 210 that is a moving path of an incident signal divided from the first optical coupler 240. The second loop mirror 220 and 250 includes the second optical coupler 250 and the second optical fiber 220. Preferably, the incident and transmitted light waves are guided by the optical fiber 230.

An optical process related to the cascaded difference frequency generation is similar to the description for operational principle of FIG. 1, and the loop mirrors can be directly attached to the optical fiber in view of the characteristics of the fiber mirrors, thereby can improve the conversion efficiency.

According to such a resonant structure, the first loop mirror 210 and 240 transmits the signal light and the pump light but reflects the second harmonic wave of the pump light. The second loop mirror 220 and 250 transmits the converted light, but reflects the second harmonic wave of the pump light to thereby have a structure capable of reciprocating and resonating inside the resonator.

Figure 4:
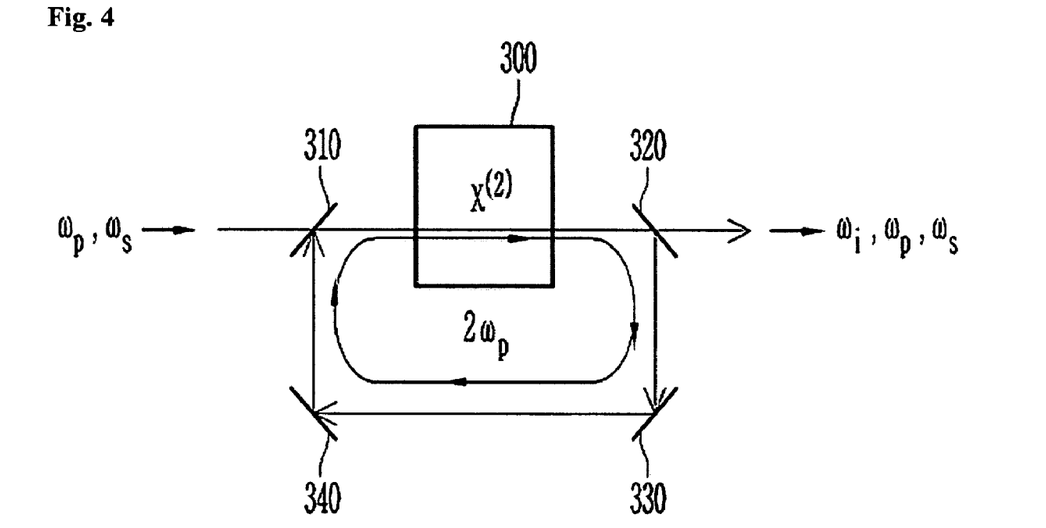

FIG. 4 is a diagram for explaining a resonant structure composed of a multiple of optical mirrors usable in a resonant cascaded difference frequency generator according to a preferred embodiment of the present invention.

This resonant structure includes the first to the fourth optical mirrors 310, 320, 330, and 340. In addition, it can be constructed to fully and selectively reflect only the second harmonic wave (2Wp) of the pump light (Wp), and arranged slightly sloped in the opposite direction from each other so that the second harmonic wave (2Wp) of the pump light (Wp) may circulate through the first to the fourth optical mirrors 310, 320, 30, and 340 and resonate in a single direction. Additionally, this resonator has a structure that the second optical mirror 320 with the selective transmission and reflection properties circulates the second harmonic wave (2Wp) of the pump light (Wp), at its output part, outside of the nonlinear medium 300 using the third and the fourth optical mirrors 330 and 340. The first optical mirror 310 makes the circulated second harmonic wave incident on the second optical mirror 320, while the nonlinear medium 300 is positioned in the propagating direction of the incident light.

In other words, the resonant structure reflects and circulates, at its output part, the second harmonic wave (2Wp) propagating without participating in the interaction of the difference frequency generation outside of the nonlinear medium 300 using the mirrors, and then guides again back to the input part. The rest of the optical process related to the cascaded difference frequency generation is equal to the description in FIG. 1.

Figure 5:
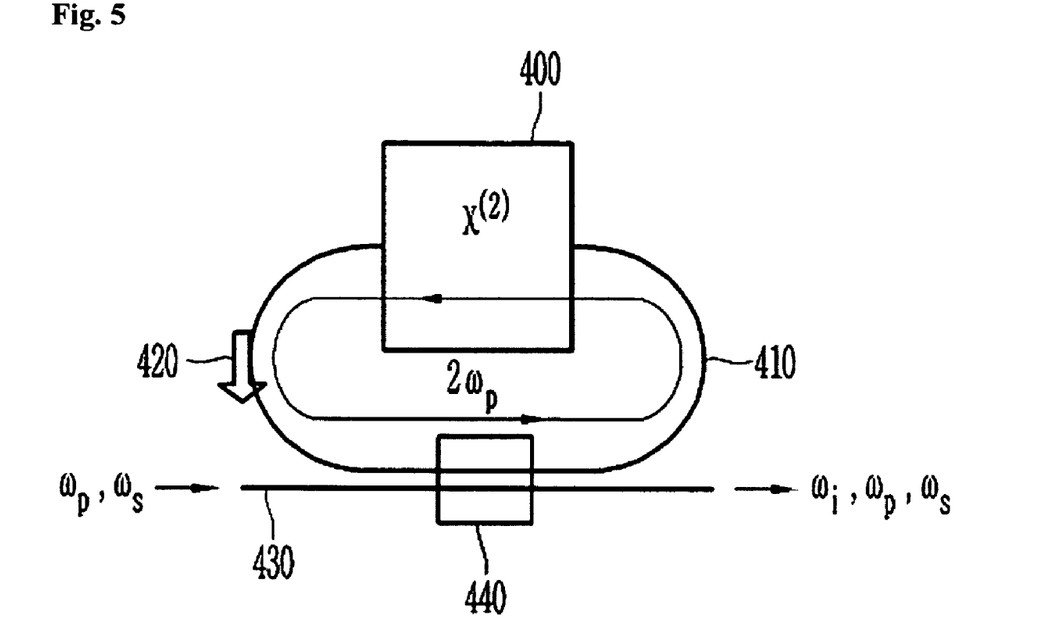
Figure 6:
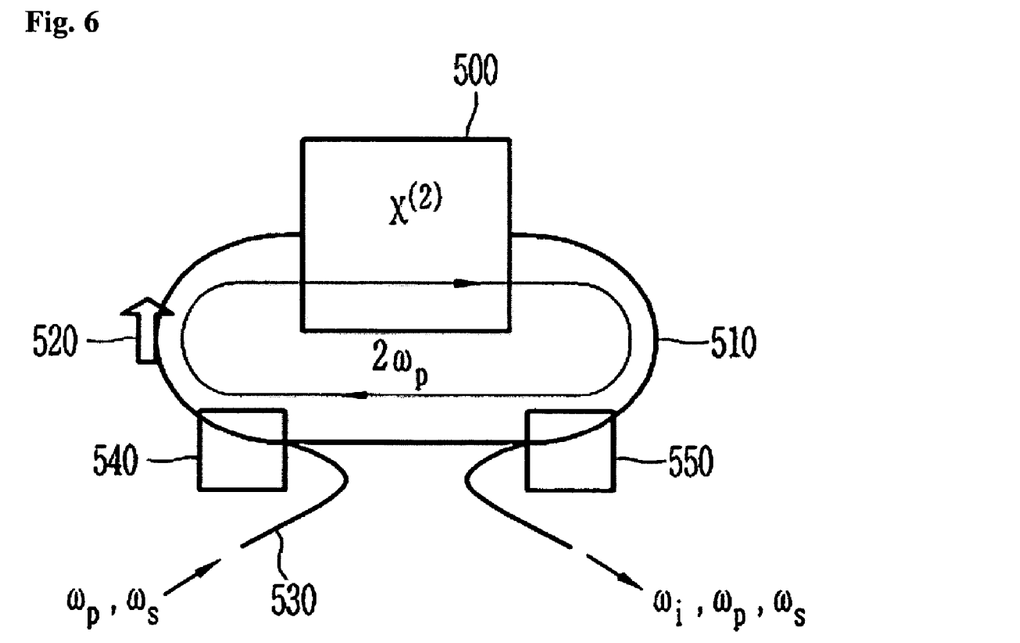

FIGS. 5 and 6 are diagrams for explaining resonant structures composed of an optical fiber ring resonator usable in a resonant cascaded difference frequency generator according to a preferred embodiment of the present invention.

The resonant structure in FIG. 5 includes an optical fiber ring resonator 410 installed at a nonlinear medium 400, at least one isolator 420 installed at the optical fiber ring resonator 410, an input-output coupler (for example, WDM optical coupler) 440 installed at the optical fiber ring resonator 410, and an optical fiber 430 connected to the input-output coupler 440. In addition, the resonator has a structure that the input-output coupler 440 guides the signal light and the pump light that are incident along the optical fiber 430 into the optical fiber ring resonator 410. The coupler 440 also guides the converted light, the signal light, and the pump light propagating along the optical fiber ring resonator 410 through the nonlinear medium 400 into the optical fiber 430 to transmit them outside. However, it selectively guides only the second harmonic wave of the pump light back into the optical fiber ring resonator 410, thereby makes the second harmonic wave of the pump light circulate and resonate in a single direction. The isolator 420 has a function that it allows the light waves to propagate in a single direction, even though it is not an indispensable element.

On the other hand, the resonant structure in FIG. 6 includes an optical fiber ring resonator 510 installed at a nonlinear medium 500, at least one isolator 520 installed at the optical fiber ring resonator 510, an input coupler (for example, WDM optical coupler) 540 installed at the optical fiber ring resonator 510, an optical fiber 530 connected to the input coupler 540, and an output coupler 550 connected to the optical fiber 530.

The difference between the resonant structures in FIGS. 5 and 6 is that the resonant structure in FIG. 5 has an input and output parts coupled to the resonator by means of the single input-output coupler, while the resonant structure in FIG. 6 has an input part and an output part coupled to the resonator by means of the independent couplers.

By the way, if comparing the resonant structures in FIGS. 5 and 6 with that in FIG. 4, we see that the resonant structures in FIGS. 5 and 6 are composed of single directional resonators employing the optical fibers and the couplers instead of a multiple of the resonant mirrors in FIG. 4. In FIGS. 5 and 6, the incident pump light and the signal light propagate from the coupler to the optical fiber ring resonator to perform the nonlinear interactions inside the material, and then transmitted outside of the resonator by way of the coupler together with the converted light. However, the second harmonic wave of the pump light continuously circulates and resonates in a single direction along the optical fiber ring resonator. The rest of the optical process is equal to the description in FIG. 4.

Figure 7:
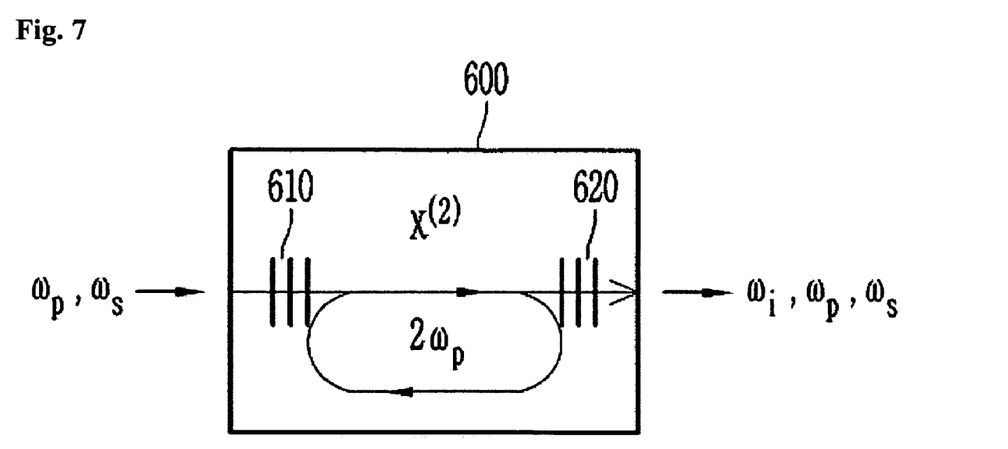

FIG. 7 is a diagram for explaining a resonant structure composed of grating mirrors constructed inside a nonlinear material itself in a resonant cascaded difference frequency generator according to a preferred embodiment of the present invention. In the resonant structure according to this method, the first and the second grating structural mirrors 610 and 620 are fabricated at both inner sides of a nonlinear medium 600, for example, such as $LiNbO_3$ (Lithium niobate) (see, B. K. Das, H. Suche and W. Sohler, "Single frequency Ti:Er:$LiNbO_3$ distributed Bragg reflector waveguide laser with thermally fixed photorefractive cavity," Appl. Phys. B, vol. 73, pp. 439–442, 2001). A grating made of a material itself for playing a role of the mirrors may be fabricated using holographic equipments and an Ar-ion laser. A periodic interference pattern is generated by a borderline of a wave front and a subsequent superposition. Such incidence of light causes a distribution of electric field by a periodic space charge and changes the refractive index to make the Bragg reflective grating. Since this grating is unstable if it is fabricated at a room temperature, this grating is at a high temperature about 180° C.

Figure 8:
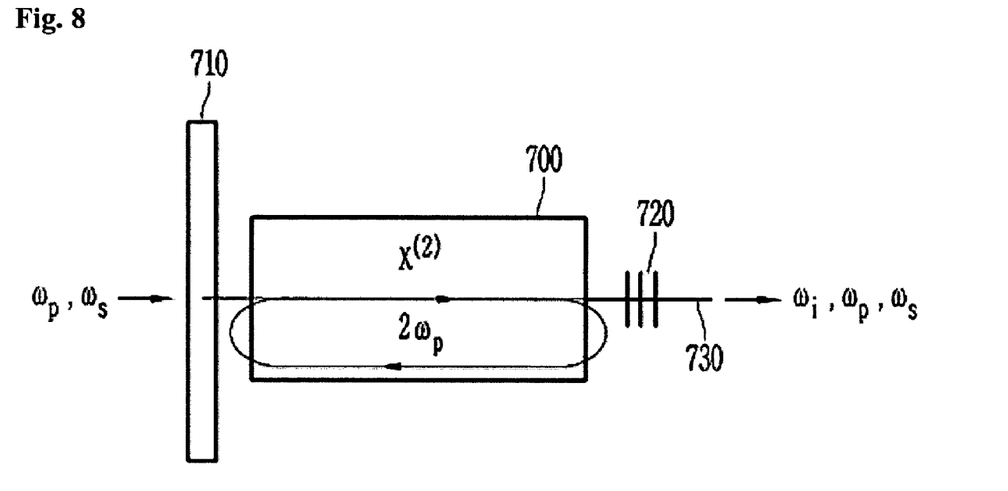

By the way, each resonant structure in FIGS. 1 to 4 and 7 described above can have a combined form. For example, the resonant structure can be constructed in the combined form that a dielectric mirror, a optical fiber grating mirror, a loop mirror, or a grating mirror fabricated inside the nonlinear medium is placed at the input part of the lights, while another mirror which is different from the one at the input part is placed at the output part. FIG. 8 is a schematic construction diagram illustrating a combined example of the resonant structures in FIGS. 1 and 2. This resonant structure includes a dielectric mirror 710 installed at one side of a nonlinear medium 700, and an optical fiber grating mirror 720 installed at the other side of nonlinear medium 700, wherein the optical fiber grating mirror 720 is connected to an optical fiber 730.

Besides, in constructing the resonant structure, the various modifications of the invention can be possible without departing from the spirit and the scope of the present invention, such as composing a resonant structure by combinations of elements described above. Therefore, the above description related to the preferred embodiments of the invention is presented only as an object of an example and is not meant to limit the scope of the invention, which is defined by the following claims and its equivalents.

As described above, the present invention makes use of the resonant structure, in a physical viewpoint, in the process of the cascaded difference frequency generation by virtue of the second-order nonlinear optical phenomena. It thereby provides the technology of the resonant cascaded difference frequency generation that makes it possible to obtain the improved conversion efficiency, when compared with the simple process of the cascaded difference frequency generation of the prior art.

In addition, according to this invention, by classifying and analyzing the resonant structures related to the process of the cascaded difference frequency generation, various types of the resonant cascaded difference frequency generators can be provided, and thereby enable us to provide the cascaded difference frequency generators with the various resonant structures in accordance with needs and applications.

What is claimed is:

1. A resonant cascaded difference frequency generator using a resonant structure, comprising:
    a nonlinear medium that receives a pump light and a signal light to generate the second harmonic wave through the second-order nonlinear interaction of the pump light, and that in a cascaded way generates a converted light of a difference frequency through the second-order nonlinear interaction of the signal light and the second harmonic wave; and
    a resonant structure that makes the second harmonic wave resonate on the basis of the nonlinear medium.

2. The resonant cascaded difference frequency generator as recited in claim 1, wherein the resonant structure transmits the signal light, the pump light, and the converted light, but reflects the second harmonic wave so that the second harmonic wave may not be transmitted outside but may be reciprocated or circulated to resonate inside.

3. The resonant cascaded difference frequency generator as recited in claim 1, wherein the resonant structure comprises:
    a first dielectric mirror installed at one side of the nonlinear medium; and
    a second dielectric mirror installed at the other side of the nonlinear medium.

4. The resonant cascaded difference frequency generator as recited in claim 1, wherein the resonant structure comprises:
    a first optical fiber grating mirror installed at one side of the nonlinear medium; and
    a second optical fiber grating mirror installed at the other side of the nonlinear medium.

5. The resonant cascaded difference frequency generator as recited in claim 4, wherein the optical signals that are incident on and transmit the first and the second optical fiber grating mirror respectively are guided by optical fibers.

6. The resonant cascaded difference frequency generator as recited in claim 1, wherein the resonant structure comprises:
    a first optical fiber loop mirror installed at one side of the nonlinear medium; and
    a second optical fiber loop mirror installed at the other side of the nonlinear medium.

7. The resonant cascaded difference frequency generator as recited in claim 6, wherein the first and the second optical fiber loop mirror respectively includes a coupler and an optical fiber.

8. The resonant cascaded difference frequency generator as recited in claim 6, wherein the optical signals that are incident on and transmit the first and the second optical fiber loop mirror respectively are guided by optical fibers.

9. The resonant cascaded difference frequency generator as recited in claim 1, wherein the resonant structure comprises:
    a first grating mirror installed at one inner side of the nonlinear medium itself; and
    a second grating mirror installed at the other inner side of the nonlinear medium itself.

10. The resonant cascaded difference frequency generator as recited in claim 1, wherein the resonant structure comprises:
    a first optical mirror installed at one side of the nonlinear medium;
    a second optical mirror installed at the other side of the nonlinear medium; and
    a third and a fourth optical mirror installed at the outsides of the nonlinear medium,
    wherein the first to the fourth mirrors transmit the signal light, the pump light, and the converted light, but selectively circulate only the second harmonic wave of the pump light outside of the nonlinear medium to resonate.

11. The resonant cascaded difference frequency generator as recited in claim 1, wherein the resonant structure comprises:
    an optical fiber ring resonator that has an optical path of the lights placed in the nonlinear medium;
    an optical fiber that delivers the lights to and from the optical fiber ring resonator; and
    an input-output coupler connected to the optical fiber and the optical fiber ring resonator,
    wherein the input-output coupler, which first guides the signal light and the pump light that are incident from the optical fiber into the optical fiber ring resonator, then guides the converted light, the signal light, and the pump light, which propagate along the optical fiber ring resonator through the nonlinear medium, into the optical fiber to transmit the lights outside, but selectively guides only the second harmonic wave of the pump light back to the optical fiber ring resonator again, so that the second harmonic wave of the pump light may circulate along the optical fiber ring resonator to resonate only in a single direction.

12. The resonant cascaded difference frequency generator as recited in claim 11, wherein the optical fiber ring resonator includes at least one isolator.

13. The resonant cascaded difference frequency generator as recited in claim 1, wherein the resonant structure comprises:
    an optical fiber ring resonator that has an optical path of the lights placed in the nonlinear medium;
    an optical fiber that delivers the lights to and from the optical fiber ring resonator;

an input coupler connected to the optical fiber and the optical fiber ring resonator to transmit the iights; and an output coupler connected to the optical fiber and the optical fiber ring resonator to transmit the lights, wherein the input coupler first guides the signal light and the pump light that are incident from the optical fiber into the optical fiber ring resonator, while the output coupler then guides the converted light, the signal light, and the pump light, which propagate along the optical fiber ring resonator through the nonlinear medium, into the optical fiber to transmit the lights outside, but the input and the output couplers selectively guide only the second harmonic wave of the pump light back into the optical fiber ring resonator again, so that the second harmonic wave of the pump light may circulate along the optical fiber ring resonator to resonate only in a single direction.

14. The resonant cascaded difference frequency generator as recited in claim 13, wherein the optical fiber ring resonator includes at least one isolator.

15. The resonant cascaded difference frequency generator as recited in claim 1, wherein the resonant structure comprises:
- a first resonant element composed of any one of a dielectric mirror, an optical fiber grating mirror, and a loop mirror installed at one side of the nonlinear medium, and a grating mirror formed at one inner side of the nonlinear medium itself; and
- a second resonant element composed of any one of a dielectric mirror, a optical fiber grating mirror, and a loop mirror installed at the other side of the nonlinear medium, and a grating mirror formed at other inner side of the nonlinear medium itself.

* * * * *